(12) United States Patent
Shimanouchi et al.

(10) Patent No.: US 8,665,579 B2
(45) Date of Patent: Mar. 4, 2014

(54) VARIABLE CAPACITOR, MATCHING CIRCUIT ELEMENT, AND MOBILE TERMINAL APPARATUS

(75) Inventors: Takeaki Shimanouchi, Kawasaki (JP); Masahiko Imai, Kawasaki (JP); Xiaoyu Mi, Kawasaki (JP); Satoshi Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 484 days.

(21) Appl. No.: 12/366,417

(22) Filed: Feb. 5, 2009

(65) Prior Publication Data

US 2009/0207549 A1 Aug. 20, 2009

(30) Foreign Application Priority Data

Feb. 20, 2008 (JP) ................................. 2008-038808

(51) Int. Cl.
*G01G 5/00* (2006.01)

(52) U.S. Cl.
USPC ........... 361/277; 361/280; 361/287; 361/270; 361/292; 361/278

(58) Field of Classification Search
USPC ......... 361/272, 277, 287, 280, 270, 271, 278, 361/290, 292
See application file for complete search history.

(56) References Cited

U.S. PATENT DOCUMENTS

| | | | |
|---|---|---|---|
| 6,215,644 B1 | 4/2001 | Dhuler | |
| 6,242,989 B1 | 6/2001 | Barber et al. | |
| 6,750,742 B2 * | 6/2004 | Kang et al. | 333/262 |
| 7,232,699 B1 | 6/2007 | Lagnado et al. | |
| 7,283,025 B2 * | 10/2007 | Lee et al. | 335/78 |
| 7,446,994 B2 * | 11/2008 | Shimanouchi et al. | 361/278 |
| 2003/0099082 A1 | 5/2003 | Tuo et al. | |
| 2003/0223176 A1 | 12/2003 | Fujii et al. | |
| 2004/0113727 A1 | 6/2004 | Kawai | |
| 2006/0086597 A1 | 4/2006 | Lee et al. | |
| 2006/0226735 A1 | 10/2006 | Ikehashi | |
| 2007/0039147 A1 | 2/2007 | Shimanouchi et al. | |

(Continued)

FOREIGN PATENT DOCUMENTS

| | | |
|---|---|---|
| CN | 1409865 A | 4/2003 |
| DE | 100 43 758 A1 | 7/2001 |

(Continued)

OTHER PUBLICATIONS

Chinese Office Action dated Dec. 27, 2010, issued in corresponding Chinese Patent Application No. 2009-10007666.9.

(Continued)

*Primary Examiner* — Robert J Hoffberg
*Assistant Examiner* — Hung Dang
(74) *Attorney, Agent, or Firm* — Westerman, Hattori, Daniels & Adrian, LLP

(57) ABSTRACT

There is proved a variable capacitor that includes a substrate, a signal line disposed on a surface of the substrate for feeding a signal, a ground electrode disposed on the surface, and a movable electrode opposed the signal line and the ground electrode, the movable electrode operable to move toward and away from the signal line and the ground electrode. The movable electrode can be displaced by an electrostatic attraction between the movable electrode and the signal line and between the movable electrode and the signal line. An amount of displacement of the movable electrode varies according to an amount of the voltage which generates the electrostatic attraction.

12 Claims, 17 Drawing Sheets

(56) References Cited

U.S. PATENT DOCUMENTS

2007/0183116 A1 8/2007 Combi et al.
2007/0206340 A1 9/2007 Shimanouchi et al.
2008/0180872 A1 7/2008 Mishima et al.

FOREIGN PATENT DOCUMENTS

| EP | 0 986 077 A2 | 3/2000 |
| FR | 2 901 781 A1 | 12/2007 |
| JP | 2002-250665 A | 9/2002 |
| JP | 2003-527746 A | 9/2003 |
| JP | 2004-74341 A | 3/2004 |
| JP | 2005-197997 A | 7/2005 |
| JP | 2006-165380 A | 6/2006 |
| JP | 2006-210843 A | 8/2006 |
| JP | 2006-228717 A | 8/2006 |
| JP | 2007-274932 A | 10/2007 |
| JP | 2008-181725 A | 8/2008 |
| KR | 10-2004-0051512 A | 6/2004 |
| KR | 10-2005-0023144 B1 | 9/2005 |
| WO | 2007/138102 A1 | 12/2007 |

OTHER PUBLICATIONS

Korean Office Action date Nov. 17, 2010, issued in corresponding Korean Pateant Application No. 10-2009-0013902.
European Search Report dated Jun. 10, 2009, issued in corresponding European Patent Application No. 09152019.7.
Chinese Office Action dated Aug. 4, 2011, issued in corresponding Chinese Patent Application No. 200910007666.9.
Japanese Office Action dated Jul. 17, 2012, issued in corresponding Japanese Patent Application No. 2008-038808, (7 pages). With English Translation.

* cited by examiner

RELATED ART

VARIABLE CAPACITOR, MATCHING CIRCUIT ELEMENT, AND MOBILE TERMINAL APPARATUS

CROSS-REFERENCE TO RELATED APPLICATION

This application is based upon and claims the benefit of priority of the prior Japanese Patent Application No. 2008-038808, filed on Feb. 20, 2008, the entire contents of which are incorporated herein by reference.

BACKGROUND OF THE INVENTION

1. Field of the Invention

The invention relates to a variable capacitance element (variable capacitor) and, more particularly, to a variable capacitor that is fabricated with a Micro Electro Mechanical System (MEMS) technology, a matching circuit element that uses the variable capacitor, and a mobile terminal apparatus that uses the variable capacitor or the matching circuit element.

2. Description of the Related Art

A variable capacitor is an important component in an electric circuit, such as a variable frequency oscillator, a tuned amplifier, a phase shifter, and an impedance matching circuit. In recent years, the number of mobile terminal apparatuses in which a variable capacitor is mounted has been increasing. In the technical field of the mobile terminal apparatus, with an increase in the number of components mounted, and the like, for high performance, the need for miniaturization of components used is growing. To respond to the need, miniaturization of a variable capacitor is pursued utilizing a MEMS technology. The variable capacitor produced through the MEMS technology is advantageous in that a Q value may be increased because of a small loss as compared with a varactor diode that is mainly used currently, and development of the variable capacitor has been promoted.

A variable capacitor that is produced through the MEMS technology is, for example, described in Japanese Laid-open Patent Publication 2007-273932, in which the variable capacitor varies its capacitance by changing the distance between the opposite two electrodes.

FIG. 28 and FIG. 29 are cross-sectional views of an existing typical variable capacitor F1. The variable capacitor F1 includes a substrate 101, a fixed electrode 102, a movable electrode 104, a dielectric layer 105, and a pair of supports 106. The fixed electrode 102 is provided on the upper face (a face on the upper side in FIG. 28) of the substrate 101. The movable electrode 104 is provided above the fixed electrode 102 so as to be bridged with the pair of supports 106. The movable electrode 104 has a portion that faces the fixed electrode 102. The dielectric layer 105 is provided on the upper face of the fixed electrode 102 in order to prevent short circuit due to contact of the fixed electrode 102 with the movable electrode 104. The substrate 101 is made of a silicon material, and the fixed electrode 102 and the movable electrode 104 are respectively made of predetermined metal materials.

In the variable capacitor F1, a voltage applied between the fixed electrode 102 and the movable electrode 104, generates electrostatic attraction between them. Due to the electrostatic attraction, the movable electrode 104 is attracted toward the fixed electrode 102 to change the distance between the electrodes 102 and 104. This change in the distance varies a capacitance between the electrodes 102 and 104. Thus, by changing a voltage applied between the fixed electrode 102 and the movable electrode 104, it is possible to vary the capacitance.

Because of an extremely thin thickness of the dielectric layer 105, the capacitance of the variable capacitor F1 has a characteristic such that it is substantially inversely proportional to a distance d. The characteristic, however, differs in a region in which an influence on the capacitance value of the dielectric layer due to the distance d between the movable electrode 104 and the fixed electrode 102 cannot be ignored (for example, a region in which the movable electrode 104 is located in proximity to the fixed electrode 102).

Thus, the capacitance of the variable capacitor F1 is minimal in a state where the fixed electrode 102 is separated from the movable electrode 104 (a state where the distance d between the electrodes is maximal, see FIG. 28). On the contrary, the capacitance is maximal in a state where the fixed electrode 102 is in contact with the movable electrode 104 via the dielectric layer 105 (a state where the distance d between the electrodes is minimal, see FIG. 29).

FIG. 30 shows the variation of a capacitance of the variable capacitor F1 according to a driving voltage applied to the variable capacitor F1, which applied between the fixed electrode 102 and the movable electrode 104. The abscissa axis represents a driving voltage, and the ordinate axis represents a capacitance. As the driving voltage is increased, the capacitance abruptly increases and then attains a constant value (maximum capacitance) (see point P1). On the other hand, as the driving voltage is decreased, the capacitance abruptly decreases and then attains a constant value (minimum capacitance) (see point P2).

The characteristic of the capacitance in FIG. 30 varies such that it is inversely proportional to the distance d between the electrodes as described above. The point P1 is a point at which the fixed electrode 102 contacts the movable electrode 104 via the dielectric layer 105. The point P2 is a point at which electrostatic attraction between the fixed electrode 102 and the movable electrode 104 is lost. Assuming Von for the driving voltage at the point P1 and Voff for the driving voltage at the point P2, the variable capacitor F1 may be used as a capacitive switch that switches a capacitance between at the driving voltage Voff and at the driving voltage Von.

However, when the variable capacitor F1 is actually used as a capacitive switch, the driving voltage (direct current voltage) of the movable electrode 104 should be only applied to that movable electrode 104 and not applied to other circuits connected to the variable capacitor F1. Therefore, it is necessary to provide a circuit (hereinafter, the circuit is referred to as "DC block") for blocking the driving voltage of the movable electrode 104.

FIG. 31 shows an equivalent circuit diagram of the variable capacitor F1 used as a capacitive switch connected in parallel with a signal line for an unbalanced alternating current signal.

As shown in FIG. 31, the fixed electrode 102 and the movable electrode 104 are respectively connected to a ground and a signal line 110, for example, through which an RF signal (alternating current signal) flows, and a driving voltage is applied from a DC power 113 to the movable electrode 104. A capacitor 111 as a DC block is provided between the signal line 110 and the variable capacitor F1 in order not to apply a driving voltage from the DC power 113 to the signal line 110. In addition, an inductor 114 as a circuit (hereinafter, the circuit is referred to as "RF block") for blocking an RF signal, is provided between the DC power 113 and the movable electrode 104. The inductor can prevent an RF signal flowing through the signal line 110 from being bypassed to a ground in a path between the capacitor 111 and the DC power 113.

The capacitance of the capacitor 111 must be sufficiently large with respect to the variable capacitor F1 not to influence the characteristic of the variable capacitor F1. Therefore the size of a capacitor 111 is large for a large capacitance. Thus, there has been a limit on miniaturization of a device that employs the variable capacitor F1.

In addition, the driving voltage Voff needs to be a voltage larger than a voltage induced between the fixed electrode 102 and the movable electrode 104 by an RF signal flowing through the signal line 110. Therefore, it is necessary to set the driving voltage Voff to be large when a large RF signal flows in the signal line 110. As is apparent from the characteristic shown in FIG. 30, the driving voltage Von is set to be larger than the driving voltage Voff. Consequently the driving voltage Von is so large during the maximum capacitance that an electrification phenomenon of the dielectric layer 105 is more likely to occur.

SUMMARY

An object of the invention to provide a variable capacitor that allows a driving voltage to be set small and that enables miniaturization of a device used therein.

According to an aspect of the present invention, a variable capacitor includes a substrate, a signal line that is provided on a surface of the substrate and through which a signal flows, a ground electrode that is provided on the surface of the substrate, and a movable electrode that faces the signal line and the ground electrode and that is provided displaceably in a direction to approach or leave the signal line and the ground electrode.

In a preferred embodiment of the invention, the movable electrode, when a driving voltage is applied to the movable electrode, is displaced by electrostatic attraction generated between the signal line and the ground electrode, and the amount of the displacement varies depending on the magnitude of the driving voltage.

According to the above configuration, it is configured so that a variable capacitor formed of the signal line and the movable electrode is connected in series with a variable capacitor formed of the ground electrode and the movable electrode. By so doing, a voltage applied to the signal line is divided by the two variable capacitors. Thus, it is possible to reduce a driving voltage necessary for applying electrostatic attraction between the signal line and the movable electrode and between the ground electrode and the movable electrode. In addition, because a driving voltage applied to the movable electrode is blocked by the two variable capacitors, it is not necessary to provide another capacitor, which serves as a DC block. Thus, it is possible to reduce the size of a device that employs the variable capacitor.

In a preferred embodiment, the movable electrode is fixed by supports to the surface of the substrate at both ends of the movable electrode and at a predetermined portion of the movable electrode between both ends. According to the above configuration, it is possible to suppress warpage of the movable electrode due to residual stress, or the like, in a manufacturing process.

In a preferred embodiment, the signal line and/or ground electrode are provided movably in a vertical direction with respect to the surface of the substrate. According to the above configuration, because it is possible to reduce electrostatic attraction necessary for attracting the movable electrode toward the signal line and/or the ground electrode, it is possible to suppress a driving voltage applied to the movable electrode to a lesser magnitude.

In a preferred embodiment, the signal line and the ground electrode are formed in a Coplanar Waveguide (CPW) structure. According to the above configuration, it is possible to easily control the impedance of the signal line.

In a preferred embodiment, a dielectric layer is provided between the signal line and/or the ground electrode and the movable electrode. According to the above configuration, it is possible to prevent short circuit due to contact of the signal line or ground electrode with the movable electrode.

According to a second aspect of the invention, a variable capacitor includes a substrate, an input electrode that is provided on a surface of the substrate and to which a signal is input, an output electrode that is provided on the surface of the substrate, that is not electrically connected to the input electrode and that outputs a signal, and a movable electrode that faces the input electrode and the output electrode and that is provided displaceably in a direction to approach or leave the signal line and the ground electrode.

In a preferred embodiment, the movable electrode, when a driving voltage is applied to the movable electrode, is displaced by electrostatic attraction generated between the input electrode and the output electrode, and the amount of the displacement varies depending on the magnitude of the driving voltage.

According to the above configuration, it is configured so that a variable capacitor formed of the input electrode and the movable electrode is connected in series with a variable capacitor formed of the output electrode and the movable electrode. By so doing, because a driving voltage applied to the movable electrode is blocked by the two variable capacitors, it is not necessary to provide another capacitor, which serves as a DC block. Thus, it is possible to reduce the size of a device that employs the variable capacitor.

In a preferred embodiment, the movable electrode is fixed by supports to the surface of the substrate at both ends of the movable electrode and at a predetermined portion of the movable electrode between both ends. According to the above configuration, it is possible to suppress warpage of the movable electrode due to residual stress, or the like, in a manufacturing process.

In a preferred embodiment, the input electrode and/or the output electrode are provided movably in a vertical direction with respect to the surface of the substrate. According to the above configuration, because it is possible to reduce electrostatic attraction necessary for attracting the movable electrode toward the input electrode and/or the output electrode, it is possible to suppress a driving voltage applied to the movable electrode to a lesser magnitude.

In a preferred embodiment, a ground electrode that forms a CPW structure with the input electrode and the output electrode is further provided. According to the above configuration, it is possible to easily control the impedance of the input electrode and the impedance of the output electrode.

In a preferred embodiment, a dielectric layer is provided between the input electrode and/or the output electrode and the movable electrode. According to the above configuration, it is possible to prevent short circuit due to contact of the input electrode or output electrode with the movable electrode.

According to a third aspect of the invention, a matching circuit employs the variable capacitor provided according to the first aspect or the second aspect. Thus, it is possible to reduce the driving voltage, and it is possible to keep reliability. In addition, it is possible to achieve miniaturization.

According to a fourth aspect of the invention, a mobile terminal apparatus employs the variable capacitor provided according to the first aspect or the second aspect or employs the matching circuit element provided according to the third aspect. Thus, it is possible to reduce the driving voltage, and it is possible to keep reliability. In addition, it is possible to achieve miniaturization.

Further features of the invention will become apparent through the following detailed description made with reference to the accompanying drawings.

BRIEF DESCRIPTION OF THE DRAWINGS

FIG. 19 illustrates a plan view of a Π matching circuit element using the variable capacitor shown in FIG. 5;

DESCRIPTION OF THE PREFERRED EMBODIMENTS

Hereinafter, preferred embodiments of the invention will be specifically described with reference to the drawings.

Figure 1:
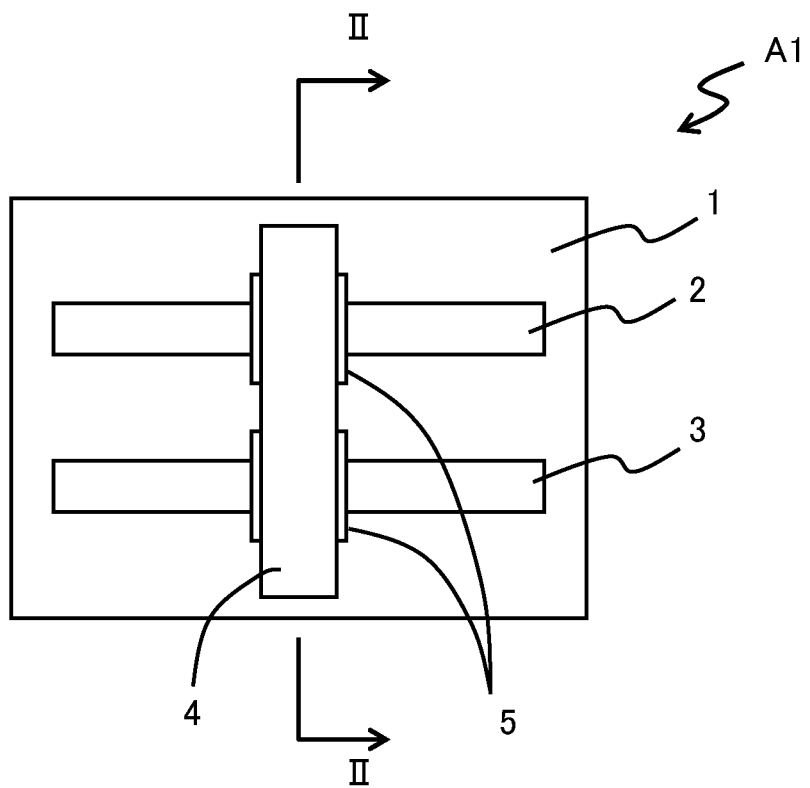
FIG. 1 illustrates a plan view of a variable capacitor according to the first embodiment.
Figure 2:
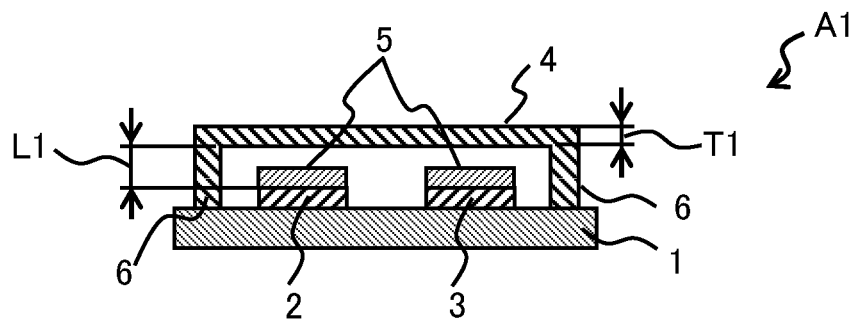
FIG. 2 illustrates is a cross-sectional view taken along the line II-II in FIG. 1.

FIG. 1 and FIG. 2 are views for illustrating a first embodiment of a variable capacitor. FIG. 1 is a plan view of the variable capacitor A1. FIG. 2 is a cross-sectional view taken along the line II-II in FIG. 1.

The variable capacitor A1 includes a substrate 1, a signal line 2, a ground electrode 3, a movable electrode 4, dielectric layers 5, and a pair of supports 6. When the variable capacitor A1 is, for example, used as a capacitive switch, the variable capacitor A1 is mounted on a printed circuit, and the signal line 2 and the ground electrode 3 are respectively connected to a signal line and ground of an electric circuit formed on the printed circuit. Note that actually the width of each dielectric layer 5 in the right-left direction in FIG. 1 is substantially equal to the width of the movable electrode 4, and the dielectric layers 5 are hidden behind the movable electrode 4 in plan view. Thus, in FIG. 1, to recognize the presence of the dielectric layers 5, the width of each dielectric layer 5 in the right-left direction is drawn wider than the width of the movable electrode 4. In addition, the width of each dielectric layer 5 in the top-bottom direction in FIG. 1 is substantially equal to the width of the signal line 2 or the width of the ground electrode 3; however, to explicitly show the presence of the dielectric layers 5, the width of each dielectric layer 5 in the top-bottom direction is also drawn wider than that is. The same applies to the plan views of the following variable capacitors.

The substrate 1 is a rectangular plate in plan view and made of a silicon material. The long side and short side of the substrate 1 each have a length of, for example, about 1 to 2 mm, and the substrate 1 has a thickness of, for example, about 300 μm.

A radiofrequency (RF) signal flows through the signal line 2. The signal line 2 is provided on an upper face (a face on the upper side in FIG. 2) of the substrate 1 so as to extend parallel to the long side of the substrate 1 to near both ends of the substrate 1 in the long side direction (lateral direction in FIG. 1). The ground electrode 3 is an electrode that is grounded. The ground electrode 3 is provided on the upper face of the substrate 1 so as to extend parallel to the signal line 2 to near both ends of the substrate 1 in the long side direction. The signal line 2 and the ground electrode 3 are made of a conductive material, such as aluminum (Al) or copper (Cu).

The movable electrode 4 is provided parallel to the short side of the substrate 1 at the center in the long side direction thereof. The movable electrode 4 extends to near both ends in the short side direction (longitudinal direction in FIG. 1) and the pair of supports 6, which will be described later, supports the movable electrode 4 at the both thereof. The movable electrode 4 is movable in a vertical direction (top-bottom direction in FIG. 2) with respect to the upper face of the substrate 1. The movable electrode 4 is provided so as to be perpendicular to the signal line 2 and the ground electrode 3 and has portions that face the signal line 2 and the ground electrode 3. The area of these faced portions is, for example, about 40000 (200×200) to 90000 (300×300) μm². The thickness T1 of the movable electrode 4 is, for example, about 1 to 2 μm. The distance L1 between the movable electrode 4 and the signal line 2 or the ground electrode 3 is about 0.5 to 2 μm (see FIG. 2). The movable electrode 4 is made of a conductive material, such as aluminum or copper.

The dielectric layers 5 are provided on the upper faces of the portions of the signal line 2 and ground electrode 3, facing the movable electrode 4. The dielectric layers 5 prevent short circuit due to contact of the signal line 2 or the ground electrode 3 with the movable electrode 4, and the thickness of each dielectric layer 5 is, for example, about 0.1 to 0.5 μm. The dielectric layers 5 are, for example, formed of a dielectric material, such as alumina ($Al_2O_3$), silicon oxide ($SiO_2$), or silicon nitride (SiNx).

The supports 6 are members that support the movable electrode 4 and are made of the same conductive material as that of the movable electrode 4. The two supports 6 respectively support the ends of the movable electrode 4 in the long side direction. A predetermined wiring pattern (not shown) that is electrically connected to the movable electrode 4 through the supports 6, the signal line 2 and the ground electrode 3 is provided on the upper face of the substrate 1.

Note that the size, shape, material, arrangement, and the like, of the substrate 1, signal line 2, ground electrode 3, movable electrode 4, dielectric layers 5 and supports 6 are not limited to the above.

The variable capacitor A1 is manufactured by means of a so-called MEMS technology. That is, first, the signal line 2, the ground electrode 3 and the dielectric layers 5 are laminated on the substrate 1. Next, a sacrificial film is formed and then the movable electrode 4 is formed. Lastly, the sacrificial film is removed through wet etching. By these processes, a movable space for the movable electrode 4 is formed. The distance L1 between the movable electrode 4 and the signal line 2 or the ground electrode 3 is adjusted by adjusting the thickness of the sacrificial film. Note that the manufacturing method for the variable capacitor A1 is not limited to the above.

Figure 3:
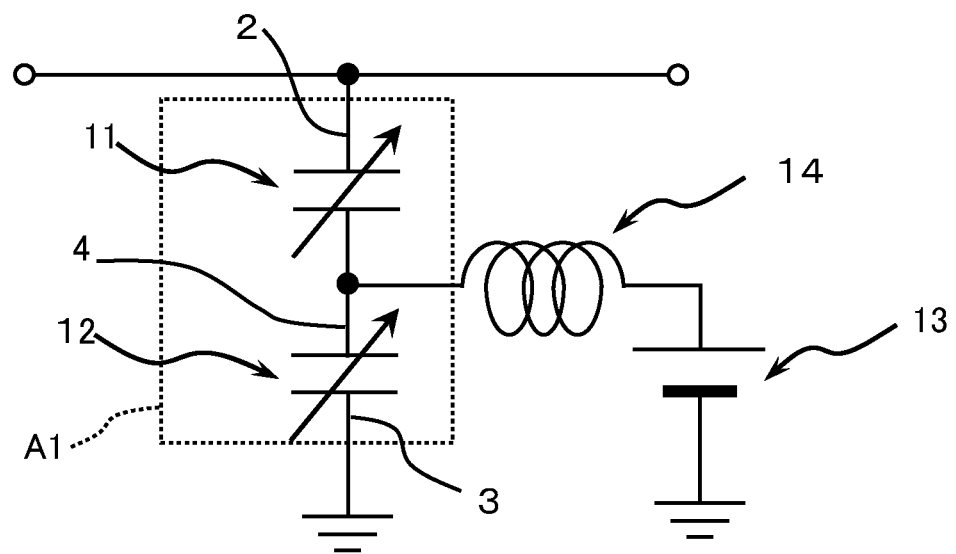
FIG. 3 illustrates an equivalent circuit diagram of the variable capacitor connected to a DC power.

FIG. 3 shows an equivalent circuit diagram of the variable capacitor A1 which is connected to a DC power that supplies a driving voltage to the variable capacitor A1. In the drawing, the variable capacitor A1 is represented by two variable capacitors 11 and 12 that are connected in series. The signal line 2 and the movable electrode 4 form the variable capacitor 11. The ground electrode 3 and the movable electrode 4 form the variable capacitor 12. The movable electrode 4 of the variable capacitor A1 is connected to a DC power 13 through an inductor 14, which serves as an RF block.

Figure 30:
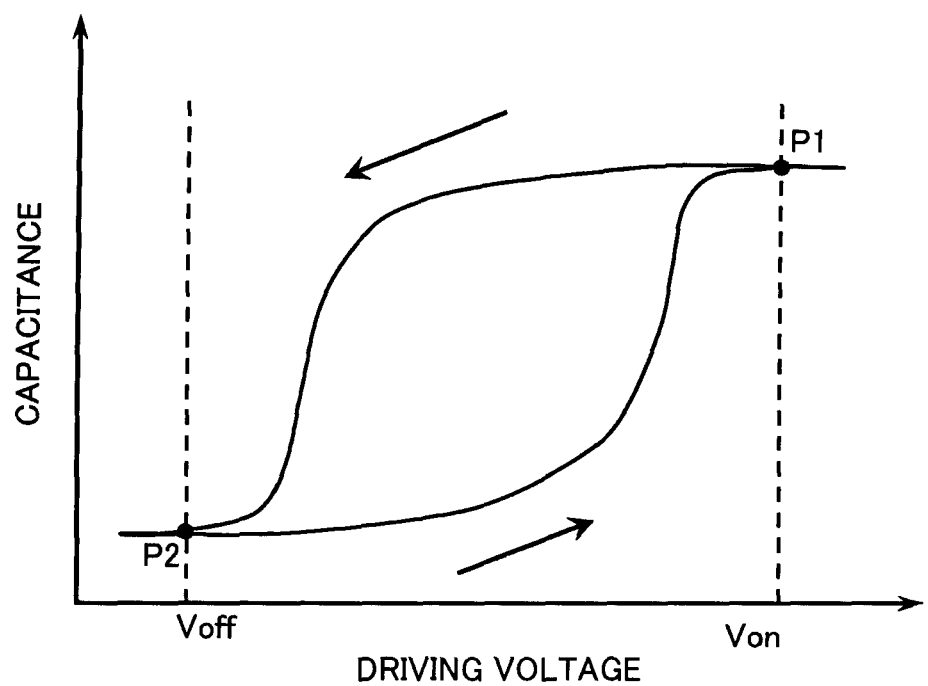
FIG. 30 shows a graph illustrating the variation of a capacitance of the variable capacitor according to a driving voltage applied to between a fixed electrode and a movable electrode in the variable capacitor.
Figure 31:
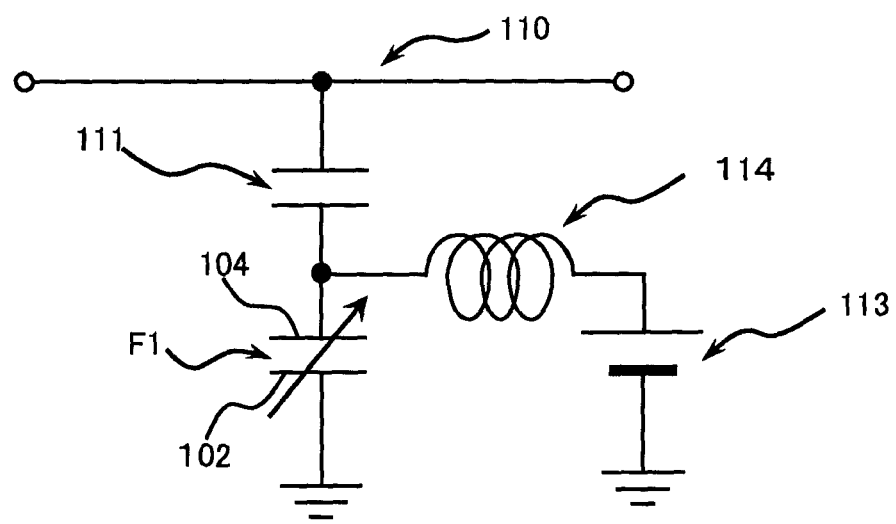
FIG. 31 illustrates an equivalent circuit diagram of the existing typical variable capacitor connected in parallel with a signal.

The movable electrode 4 is applied with a driving voltage from the DC power 13, and the variable capacitor A1 varies its capacitance according to the characteristic shown in FIG. 30. When the driving voltage is Voff, the movable electrode 4 is apart from the signal line 2 and the ground electrode 3, because the electrostatic attraction is small. Thus, the capacitance of the variable capacitor A1 is minimal. On the other hand, when the driving voltage is Von, the movable electrode 4 is in contact with the signal line 2 and the ground electrode 3 via the dielectric layers 5, because the electrostatic attraction is large. Thus, the capacitance of the variable capacitor A1 is maximal. Consequently, the variable capacitor A1 operates as a capacitive switch in such a manner that the driving voltage applied from the DC power 13 is switched between Voff and Von.

Figure 28:
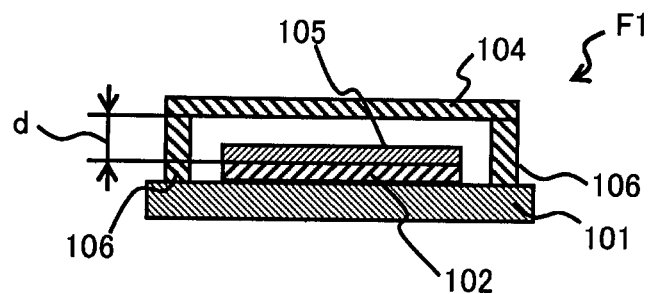
FIG. 28 illustrates a cross-sectional view of an existing typical variable capacitor in a state of the existing typical variable capacitor giving a minimal capacitance.
Figure 29:
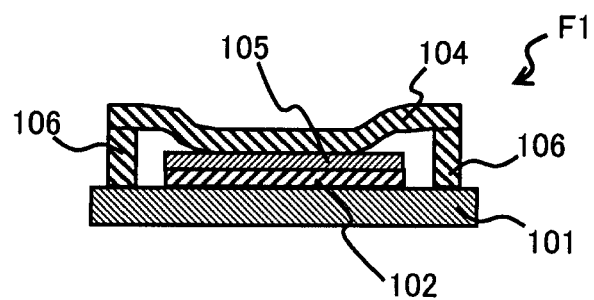
FIG. 29 illustrates a cross-sectional view of an existing typical variable capacitor in a state of the existing typical variable capacitor giving a maximum capacitance.

As shown in FIG. 3, the variable capacitor A1 is equivalently configured so that the two variable capacitors 11 and 12 are connected in series. Thus, a voltage generated on the signal line 2 by an RF signal is divided by the variable capacitors 11 and 12. Hence, voltages applied to both ends of each of the variable capacitors 11 and 12 (a voltage between the movable electrode 4 and the signal line 2 and a voltage between the movable electrode 4 and the ground electrode 3) are about half the generated voltage when the capacitances of the variable capacitors 11 and 12 are equal. Thus, it is possible to set the driving voltage Voff of the variable capacitor A1 to be smaller than the driving voltage Voff of the existing variable capacitor F1 (see FIG. 28 and FIG. 29). In this case, because the driving voltage Von may also be reduced, it is possible to suppress occurrence of electrification phenomenon of the dielectric layers 5. In addition, because only about half the voltage generated on the signal line 2 by an RF signal is applied to both ends of each of the variable capacitors 11 and 12, smaller fluctuations in voltage of the signal line 2 reduce a load applied on the variable capacitors 11 and 12. Therefore, it is possible to suppress a variation over time of the elastic constant of the movable electrode 4 to a lesser degree. Thus, it is possible to keep reliability of the variable capacitor A1.

In addition, since the variable capacitor 11 can block a driving voltage applied from the DC power 13, it is possible to prevent other electric circuits formed on the substrate from being applied with the driving voltage through the signal line 2. That is, because the variable capacitor 11 functions as a DC block, it is not necessary to provide a capacitor, which serves as a DC block, that is necessary when the existing variable capacitor F1 is used. Thus, it is possible to reduce the size of a device that employs the variable capacitor A1.

Figure 4:
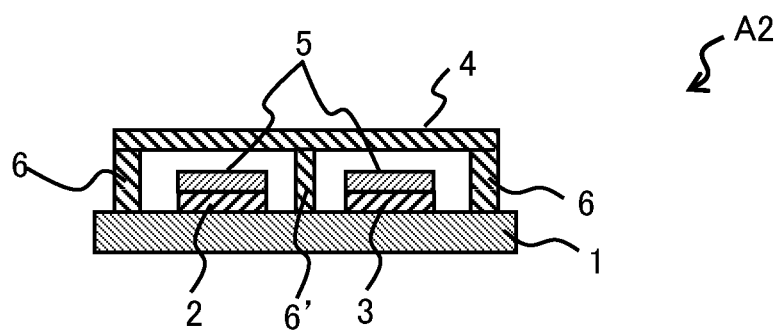
FIG. 4 illustrates a cross-sectional view of a first alternative example of the variable capacitor according to the first embodiment.

FIG. 4 is a cross-sectional view of a first alternative example of the variable capacitor A1. The plan view of the first alternative example is the same as that of FIG. 1, and, therefore, is omitted, and only the cross-sectional view corresponds to FIG. 2 is shown. A variable capacitor A2 shown in FIG. 4 differs from the variable capacitor A1 in that a support 6' is provided between the signal line 2 and the ground electrode 3. Because the movable electrode 4 of the variable capacitor A2 is supported by the support 6' around the center in the long side direction, it is possible to suppress warpage due to residual stress, or the like, in a manufacturing process. Thus, fraction defective of the variable capacitor A2 due to warpage of the movable electrode 4 is reduced as compared with the variable capacitor A1. Thus, it is possible to improve yields.

Figure 5:
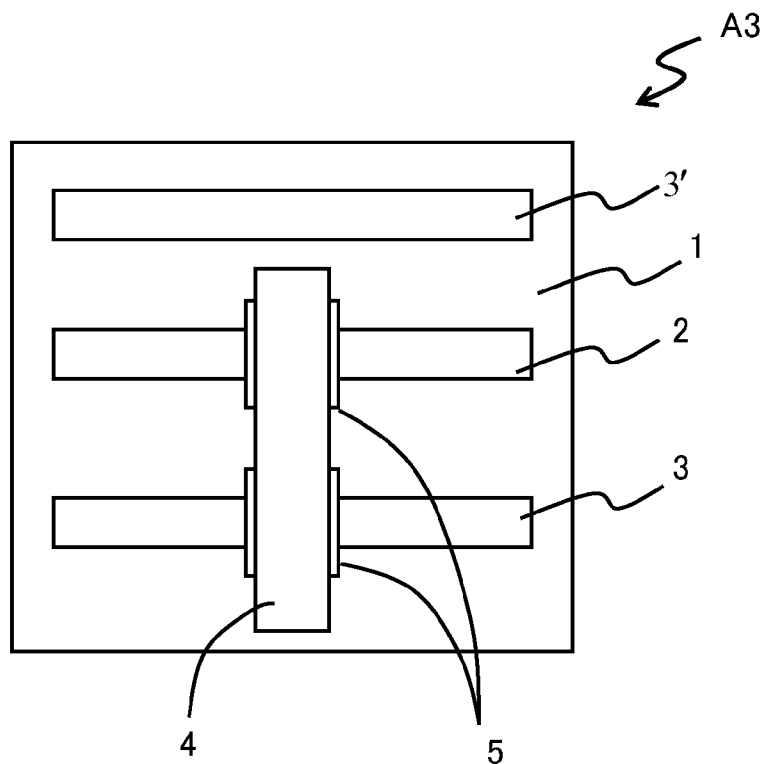
FIG. 5 illustrates a plan view of a second alternative example of the variable capacitor according to the first embodiment.

FIG. 5 is a plan view that shows a second alternative example of the variable capacitor A1. Note that a cross-sectional view that corresponds to FIG. 2 of the variable capacitor A1 is omitted. A variable capacitor A3 shown in FIG. 5 differs from the variable capacitor A1 in that a ground electrode 3' is provided on a side (upper side in FIG. 5) opposite to the side of the ground electrode 3 with respect to the signal line 2. The signal line 2 and ground electrodes 3 and 3' of the variable capacitor A3 form a coplanar waveguide (CPW) structure. Thus, in the variable capacitor A3, it is possible to easily adjust the designed impedance of the signal line 2.

Figure 6:
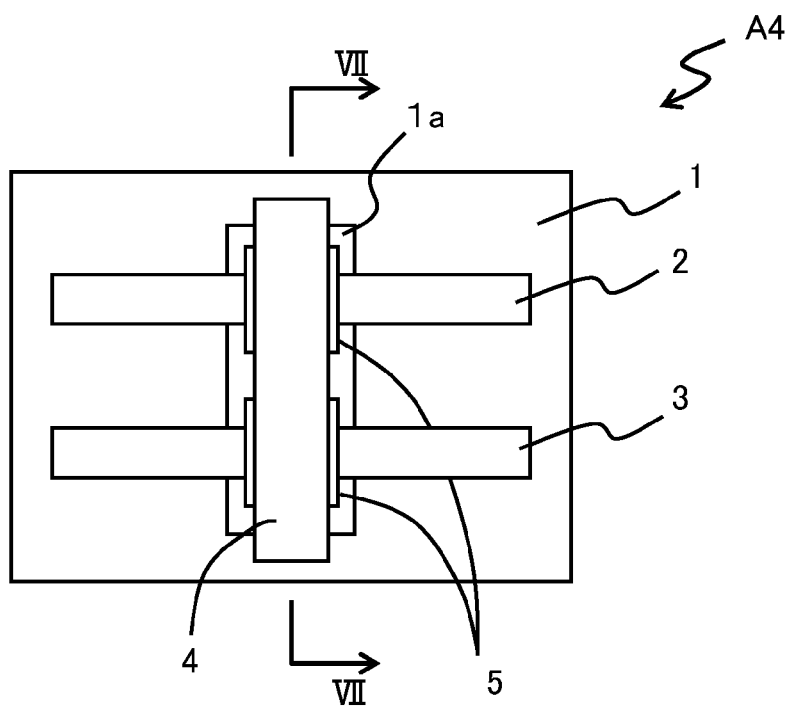
FIG. 6 illustrates a plan view of a third alternative example of the variable capacitor according to the first embodiment.
Figure 7:
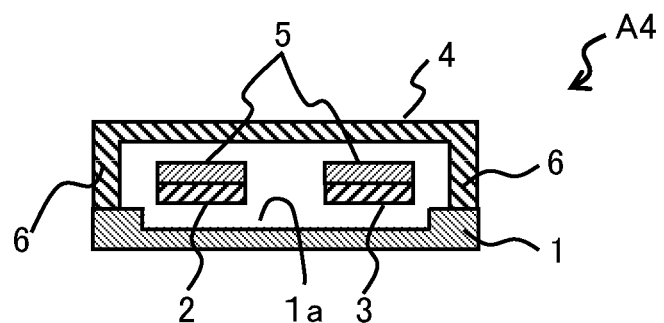
FIG. 7 illustrates a cross-sectional view of the third alternative example of the variable capacitor taken along the line VII-VII in FIG. 6.

FIG. 6 and FIG. 7 are views that show a third alternative example of the variable capacitor A1. FIG. 6 is a plan view of a variable capacitor A4. FIG. 7 is a cross-sectional view taken along the line VII-VII in FIG. 6. The variable capacitor A4 shown in FIG. 6 and FIG. 7 differs from the variable capacitor A1 in that a recess Ia is provided on the upper face of the substrate 1. The recess Ia is provided below portions of the signal line 2 and ground electrode 3, facing the movable electrode 4.

Owing to the recess 1a, the portions of the signal line 2 and ground electrode 3, facing the movable electrode 4, are movable in a vertical direction (top-bottom direction in FIG. 7) with respect to the upper face of the substrate 1. Because the movable electrode 4, the signal line 2, and the ground electrode 3 are movable, it is possible to reduce electrostatic attraction necessary to attract the movable electrode 4 and the signal line 2 and ground electrode 3 to each other. Thus, it is possible to suppress a driving voltage applied to the movable electrode 4 to a lesser magnitude. In addition, since the recess 1a decreases the area in which the signal line 2 and ground electrode 3 contact the substrate 1, electric charge that leaks from the signal line 2 or the ground electrode 3 to the substrate 1 may be suppressed. Consequently, it is possible to improve the Q value of the variable capacitor A4.

Note that in the third alternative example, the recess 1a is formed as a single large recess, but it is not limited to it. For example, a recess 1a may be provided separately below a portion of the signal line 2, facing the movable electrode 4, and below a portion of the ground electrode 3, facing the movable electrode 4. In addition, even when no recess 1a is provided, it is possible to obtain the advantageous effect that a driving voltage applied to the movable electrode 4 may be suppressed to a lesser magnitude, if the portions of the signal line 2 and ground electrode 3, facing the movable electrode 4, are configured to be movable in the vertical direction. At this time, it is applicable that only one of them is movable and the other one is fixed.

Figure 8:
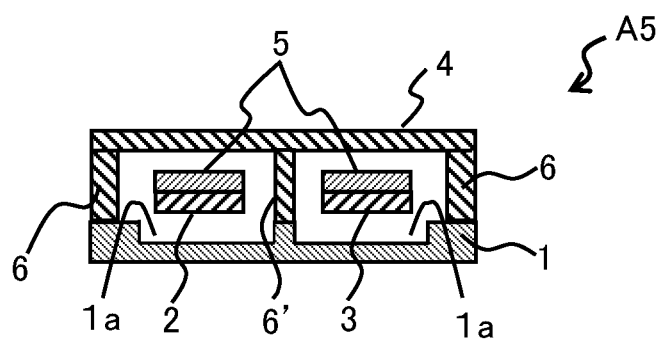
FIG. 8 illustrates a cross-sectional view of a fourth alternative example of the variable capacitor according to the first embodiment.

FIG. 8 is a cross-sectional view that shows a fourth alternative example of the variable capacitor A1. Note that the plan view of the fourth alternative example is the same as that of FIG. 6, and, therefore, is omitted, and only the cross-sectional view corresponds to FIG. 7 is shown. A variable capacitor A5 shown in FIG. 8 differs from the variable capacitor A1 in that the support 6' is provided between the signal line 2 and the ground electrode 3 and the recesses 1a are provided on the upper face of the substrate 1. The recesses 1a are respectively provided below portions of the signal line 2 and ground electrode 3, facing the movable electrode 4. The variable capacitor A5 has the advantageous effects of both the first alternative example and the third alternative example.

The dielectric layers 5 are provided on the upper faces of the signal line 2 and ground electrode 3 in the above described first embodiment and its alternative examples. However, the portion of forming the dielectric layer is not limited to on the upper faces of the signal line 2 and ground electrode 3. The dielectric layers 5 may also be provided on the lower face of the movable electrode 4. Further, the dielectric layer 5 may be provided only on the lower face of the movable electrode 4 without providing on the upper faces of the signal line 2 and ground electrode 3. In addition, when it is configured so that the movable electrode 4 do not contact the signal line 2 or the ground electrode 3 even when a driving voltage is maximal, the dielectric layers 5 need not be provided. In addition, it is applicable that the dielectric layer 5 is provided for only one of the variable capacitors 11 and 12 (see FIG. 3) when the capacitance values of the variable capacitors 11 and 12 are differentiated.

In the above described first embodiment, it is described that the variable capacitor is used in parallel connection; instead, a variable capacitor used in series connection will be described below.

Figure 9:
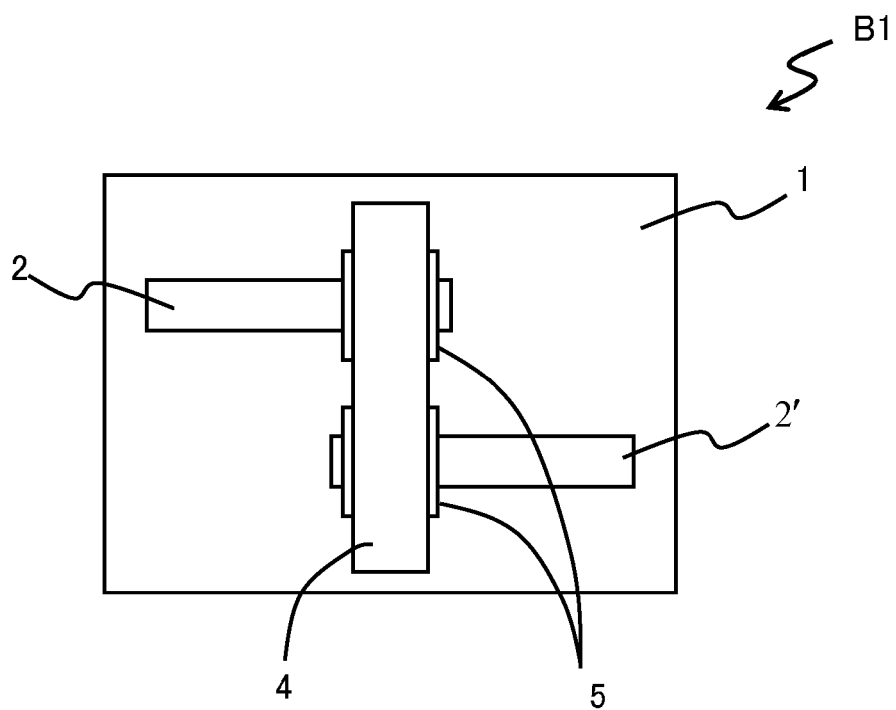
FIG. 9 illustrates a plan view of a variable capacitor according to a second embodiment.

FIG. 9 is a plan view for illustrating a second embodiment of a variable capacitor and shows a variable capacitor B1 used in series connection. In the drawing, the same or similar components to those of the first embodiment are assigned with the same references. The variable capacitor B1 differs from the variable capacitor A1 in that a signal line 2' is provided in place of the ground electrode 3 and in the shape of the signal lines 2 and 2'.

As shown in FIG. 9, in the variable capacitor B1, the signal line 2 extends from a vicinity of one end (left side in FIG. 9) of the substrate 1 in the long side direction to a portion that faces the movable electrode 4. The signal line 2' extends from a vicinity of the other end (right side in FIG. 9) of the substrate 1 in the long side direction to a portion that faces the movable electrode 4. The above configuration is to not produce the parasitic capacitance, while parallel extended portions between signal lines 2 and 2' as shown in FIG. 1 produce a parasitic capacitance.

Figure 10:
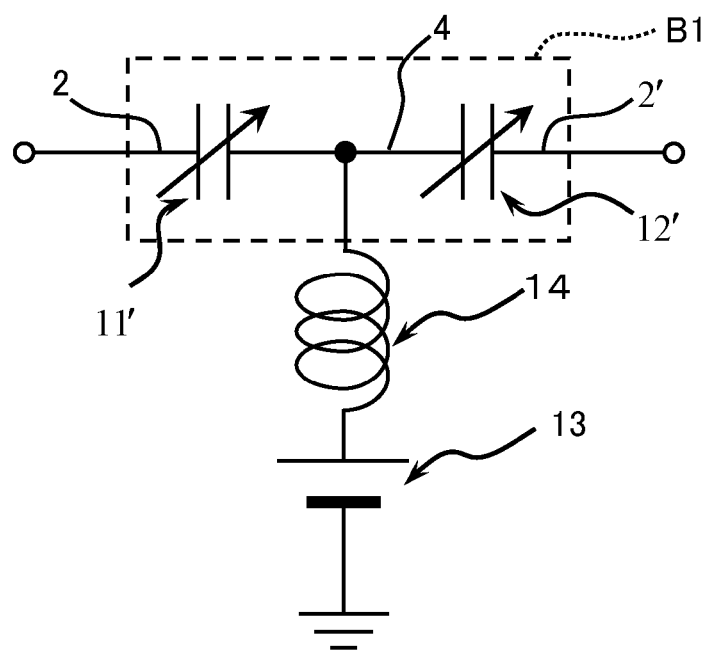
FIG. 10 illustrates an equivalent circuit diagram of the variable capacitor shown in FIG. 9 and a DC power.

FIG. 10 shows an equivalent circuit diagram of the variable capacitor B1 which is connected to a DC power for driving the variable capacitor B1. The variable capacitor B1 is represented by two variable capacitors 11' and 12' connected in series. The signal line 2 and the movable electrode 4 form the variable capacitor 11'. The signal line 2' and the movable electrode 4 form the variable capacitor 12'. The movable electrode 4 is connected to the DC power 13 through the inductor 14, which serves as an RF block.

The variable capacitor B1 differs from the variable capacitor A1 in that it is used in series connection with a signal line for an RF signal flowing from the signal line 2 to the signal line 2'. However, the variable capacitor B1 has a commonality with the variable capacitor A1 in that it operates as a capacitive switch by switching a driving voltage applied from the DC power 13 between Voff and Von.

In addition, as shown in FIG. 10, the variable capacitor B1 is configured so that the two variable capacitors 11' and 12' are connected in series. Thus, a driving voltage applied from the DC power 13 is blocked by the variable capacitors 11' and 12'. Thus It is possible to prevent other electric circuits formed on the substrate from being applied with the driving voltage through the signal lines 2 and 2'. Since the variable capacitors 11' and 12' function as a DC block, it is not necessary to provide a capacitor as a DC block, which is necessary when the existing variable capacitor F1 is used. Thus, it is possible to reduce the size of a device that employs the variable capacitor B1.

In the second embodiment as well, by providing the support 6' between the signal line 2 and the signal line 2' (see FIG. 4), it is possible to obtain the same advantageous effect as that of the first alternative example of the first embodiment. In addition, by providing the recess 1a on the upper face of the substrate 1 (see FIGS. 6 and 7), it is possible to obtain the same advantageous effect as that of the third alternative example of the first embodiment. Furthermore, by providing the support 6' between the signal line 2 and the signal line 2' and providing the recess 1a on the upper face of the substrate 1 (see FIG. 8), it is possible to obtain the same advantageous effect as that of the fourth alternative example of the first embodiment.

In the above described second embodiment as well, the dielectric layers 5 may also be provided on the lower face of the movable electrode 4, or may be provided only on the lower face of the movable electrode 4 instead of being provided on the both upper faces of the signal lines 2 and 2'. In addition, the dielectric layers 5 need not be provided when the variable capacitor B1 is configured so that the movable electrode 4 do not contact the signal line 2 or 2' at an application of a maximal driving voltage. In addition, it is applicable that the dielectric layer 5 is provided for only one of the variable capacitors 11' and 12' (see FIG. 10) when the capacitance values of the variable capacitors 11' and 12' are differentiated, or the like.

Note that the shape of the signal lines 2 and 2' is not limited to the one described in the second embodiment. If a parasitic capacitance may be ignored, the signal lines 2 and 2' may be extended to near both ends of the substrate 1 in the long side direction. In addition, the shape of the movable electrode 4 is also not limited to the one described in the second embodiment.

Figure 11:
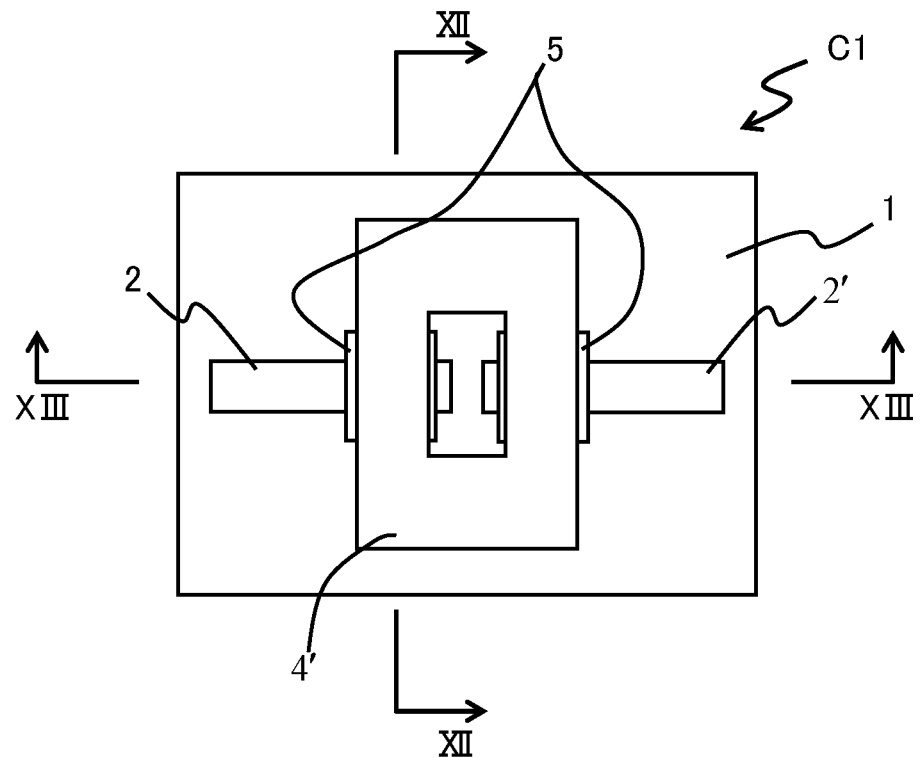
FIG. 11 illustrates a plan view of a variable capacitor according to a third embodiment.
Figure 12:
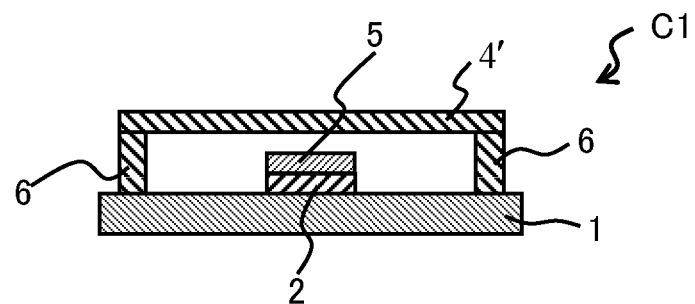
FIG. 12 illustrates a cross-sectional view of the variable capacitor according to the third embodiment taken along the line XII-XII in FIG. 11.
Figure 13:
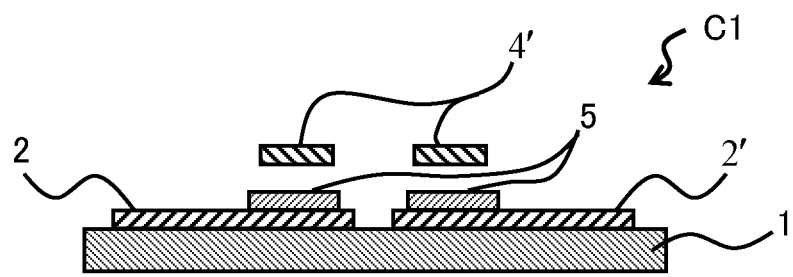
FIG. 13 illustrates a cross-sectional view of the variable capacitor according to the third embodiment taken along the line XIII-XIII in FIG. 11.

FIGS. 11, 12 and 13 are views for illustrating a third embodiment of a variable capacitor. FIG. 11 is a plan view of a variable capacitor C1; FIG. 12 a cross-sectional view taken along the line XII-XII in FIG. 11; FIG. 13 a cross-sectional view taken along the line XIII-XIII in FIG. 11. In the figures, the same or similar components to those of the second embodiment are assigned with the same references. The variable capacitor C1 differs from the variable capacitor B1 in the shape of the signal lines 2 and 2' and the shape of a movable electrode 4'.

The signal line 2 is provided parallel to the long side of the substrate 1 at the center in the short side direction so as to extend from a vicinity of one end in the long side direction to a vicinity back from the center. The signal line 2' is provided parallel to the long side of the substrate 1 at the center in the short side direction so as to extend from a vicinity of the other end in the long side direction to a vicinity back from the center. A predetermined gap is provided between the signal line 2 and the signal line 2' to prevent electrical connection and development of parasitic capacitance. The movable electrode 4' forms a substantially rectangle or square shape in plan view and is provided around the center of the substrate 1. Further the movable electrode 4' is bridged with the pair of supports 6 provided near both ends in the short side direction, and is movable in a vertical direction with respect to the upper face of the substrate 1. The movable electrode 4' has portions facing the signal lines 2 and 2'. The dielectric layers 5 are provided on the upper faces of the portions of the signal lines 2 and 2', facing the movable electrode 4'.

Since the variable capacitor C1 is formed so that only the shape of the signal lines 2, 2' and movable electrode 4' of the variable capacitor B1 are modified, the equivalent circuit diagram connected to a DC power for supplying a driving voltage is the same as that of FIG. 10. Thus, the variable capacitor C1 also does not need a capacitor, which serves as a DC block. Accordingly the variable capacitor C1 has the same advantageous effect as that of the variable capacitor B1 That is, the size of a device using the variable capacitor C1 may be reduced.

Figure 14:
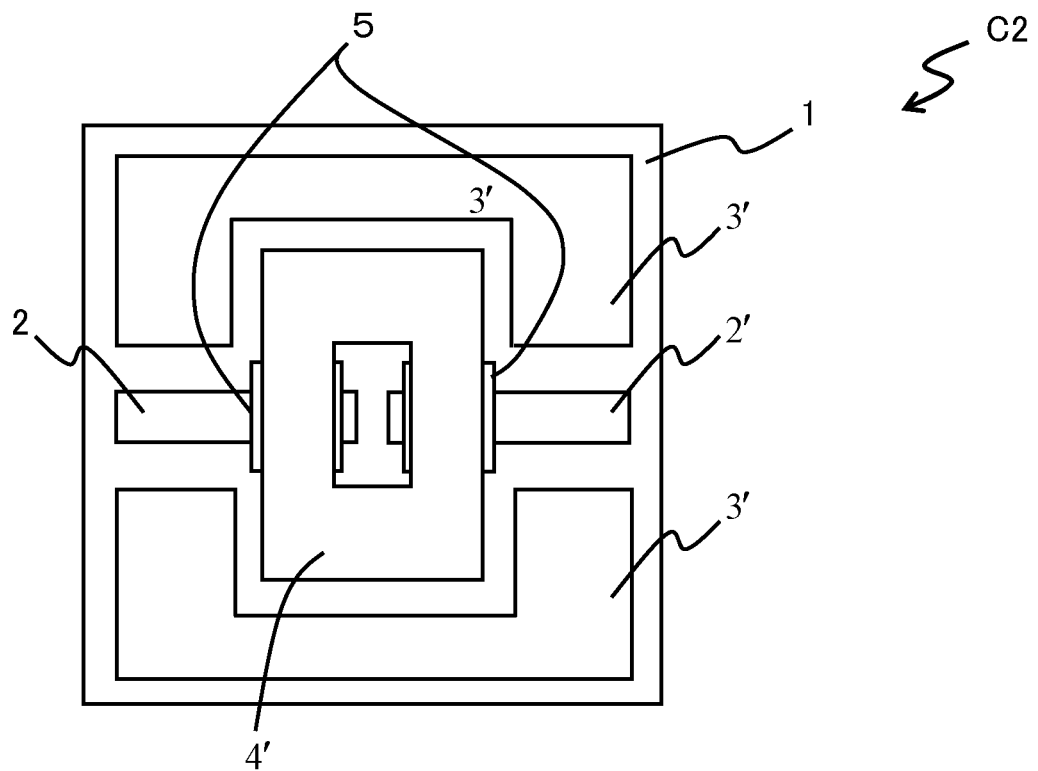
FIG. 14 illustrates a cross-sectional view of a first alternative example of the variable capacitor according to the third embodiment.

FIG. 14 is a plan view that shows a first alternative example of the variable capacitor C1. Note that cross-sectional views that correspond to FIGS. 12 and 13 of the variable capacitor C1 are omitted. A variable capacitor C2 differs from the variable capacitor C1 in that a pair of ground electrodes 3' are formed so that the signal lines 2 and 2' are placed between the pair of ground electrodes 3'. The signal lines 2, 2' and the pair of ground electrodes 3' of the variable capacitor C2 form a CPW structure. Thus, it is possible to easily adjust the designed impedance of the signal lines 2 and 2' in the variable capacitor C2 as well.

Figure 15:
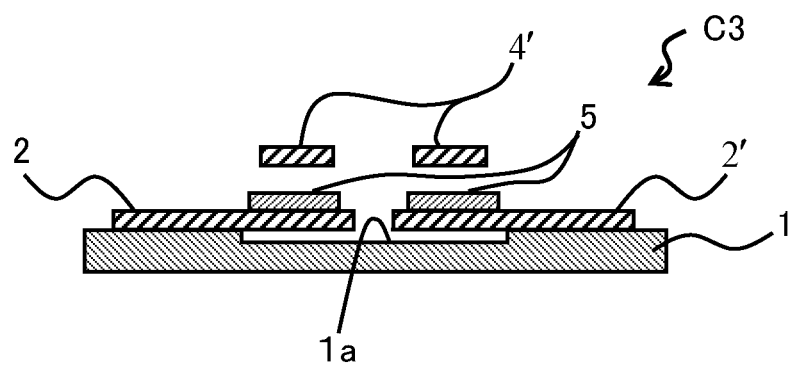
FIG. 15 illustrates a cross-sectional view of a second alternative example of the variable capacitor according to the third embodiment.

FIG. 15 is a cross-sectional view that shows a second alternative example of the variable capacitor C1. Note that the plan view that corresponds to FIG. 11 of the variable capacitor C1 and the cross-sectional view that corresponds to FIG. 12 of the variable capacitor C1 are omitted. A variable capacitor C3 shown in FIG. 15 differs from the variable capacitor C1 in that the recess 1a is provided on the upper face of the substrate 1. The recess 1a is provided below portions of the signal lines 2 and 2', facing the movable electrode 4.

Owing to the recess 1a, the portions of the signal lines 2 and 2', facing the movable electrode 4, are movable in a vertical direction (top-bottom direction in FIG. 15) with respect to the upper face of the substrate 1. It is possible to suppress a driving voltage applied to the movable electrode 4' to a lesser magnitude, because the movable electrode 4, the signal lines 2 and 2' are movable, as in the case of the variable capacitor A4 shown in FIGS. 6 and 7. In addition, the recess 1a decreases the area in which the signal lines 2 and 2' contact the substrate 1. Accordingly, electric charge leaking from the signal line 2 or 2' to the substrate 1 may be suppressed. Consequently, it is possible to improve the Q value of the variable capacitor C3.

Note that in the second alternative example, the recess 1a is formed as a single large recess, but it is not limited to it. For example, a recess 1a may be provided separately below a portion of the signal line 2, facing the movable electrode 4', and below a portion of the signal line 2', facing the movable electrode 4'. In addition, even when no recess 1a is provided, it is possible to obtain the advantageous effect that a driving voltage applied to the movable electrode 4' may be suppressed to a lesser magnitude by the configuration in which portions of the signal lines 2 and 2', facing the movable electrode 4', are movable in the vertical direction. At this configuration, it is applicable that only one of the portions is movable and the other one is fixed.

In the above described third embodiment and its alternative examples as well, the dielectric layers 5 may also be provided on the lower face of the movable electrode 4', or may be not provided on the upper faces of the signal lines 2 and 2' but provided only on the lower face of the movable electrode 4'. In addition, when it is configured so that the movable electrode 4' do not contact the signal line 2 or 2' even at a maximal driving voltage, the dielectric layers 5 need not be provided. In addition, when the capacitance values of the variable capacitor 11' and variable capacitor 12' (see FIG. 10) are differentiated, or the like, it is applicable that the dielectric layer 5 is provided for only one of them and no dielectric layer 5 is provided for the other one.

In addition, in the variable capacitor used in series connection, the shape and arrangement of each electrode may be the same as those of the third embodiment.

Figure 16:
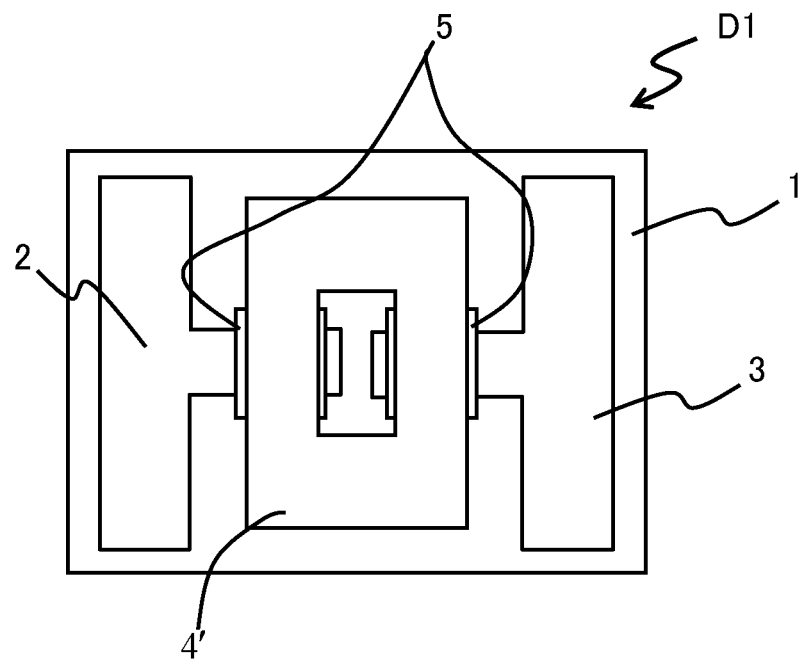
FIG. 16 illustrates a plan view of a variable capacitor according to a fourth embodiment.

FIG. 16 is a view for illustrating a fourth embodiment of a variable capacitor according to the invention and is a plan view that shows a variable capacitor D1 used in parallel connection. In FIG. 16, the same or similar components to those of the third embodiment are assigned with the same references. The variable capacitor D1 differs from the variable capacitor C1 in that the ground electrode 3 is provided in place of the signal line 2' and in the shapes of the signal line 2 and the ground electrode 3.

As shown in FIG. 16, the signal line 2 and the ground electrode 3 each have a T-shape in plan view; instead, they may be formed in the same shape as the signal lines 2 and 2' of the variable capacitor C1.

The variable capacitor D1 is formed so that only the shapes of the signal line 2, ground electrode 3 and movable electrode 4 of the variable capacitor A1 are modified. Accordingly, the equivalent circuit diagram connected to a DC power that supplies a driving voltage is the same as that of FIG. 3. Thus, since a voltage generated on the signal line 2 by an RF signal is divided by the variable capacitors 11 and 12, voltages applied to both ends of each of the variable capacitors 11 and 12 (a voltage between the movable electrode 4 and the signal line 2; and a voltage between the movable electrode 4 and the ground electrode 3) are about half the generated voltage. Thus, the variable capacitor D1 also has the same advantageous effect as that of the variable capacitor A1.

In the fourth embodiment as well, by providing the recess 1a on the upper face of the substrate 1 (see FIG. 15), it is possible to obtain the same advantageous effect as that of the second alternative example of the third embodiment.

In the above described fourth embodiment as well, the dielectric layers 5 may also be provided on the lower face of the movable electrode 4', or may be not provided on the upper faces of the signal line 2 and ground electrode 3 but provided only on the lower face of the movable electrode 4'. In addition, when it is configured so that the movable electrode 4' do not contact the signal line 2 or the ground electrode 3 even when a driving voltage is maximal, the dielectric layers 5 need not be provided. In addition, when the capacitance values of the variable capacitor 11 and variable capacitor 12 (see FIG. 3) are differentiated, it is applicable that the dielectric layer 5 is provided for only one of them.

Note that in the above described first to fourth embodiments, the case in which the variable capacitor is used as a capacitive switch is described, but it is not limited to it. When it is configured so that the capacitance smoothly varies in accordance with a change in a driving voltage applied to the movable electrode 4 or 4', it may be used as a variable capacitor that controls the capacitance using the driving voltage.

Next, the matching circuit element that employs a variable capacitor will be described.

Figure 17:
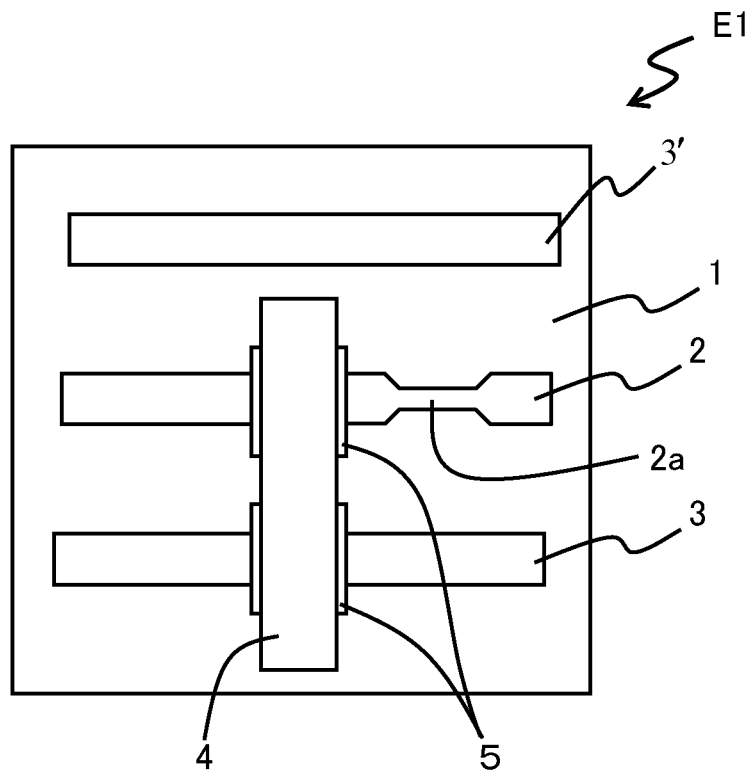
FIG. 17 illustrates a plan view of a Γ matching circuit element E1 using the variable capacitor shown in FIG. 5.
Figure 18:
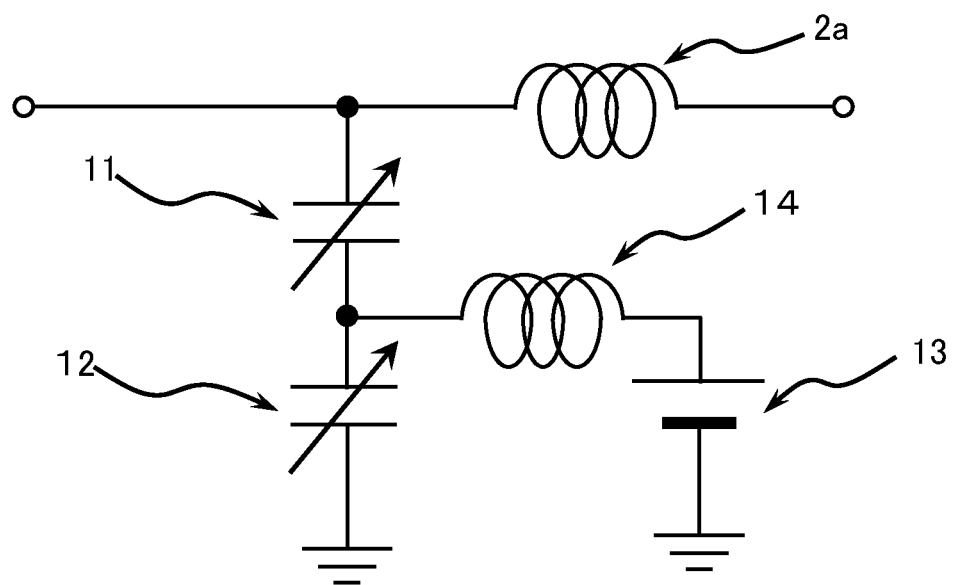
FIG. 18 illustrates an equivalent circuit diagram of the Γ matching circuit element shown in FIG. 17 and a DC power connected thereto.
Figure 19:
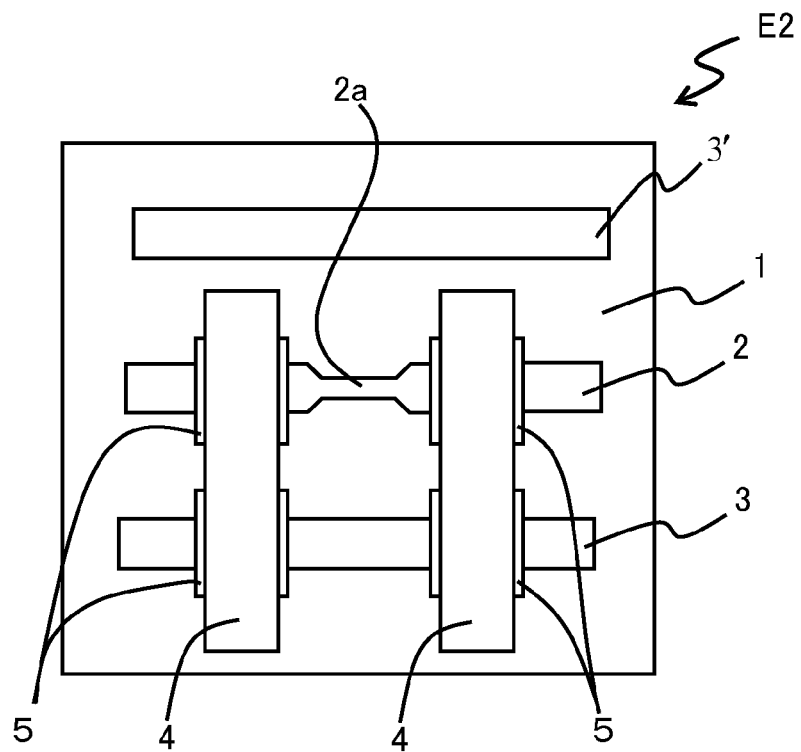
FIG. 19 is a plan view that shows a Π matching circuit element E2 in which a movable electrode 4 is further added to the variable capacitor A3 shown
Figure 20:
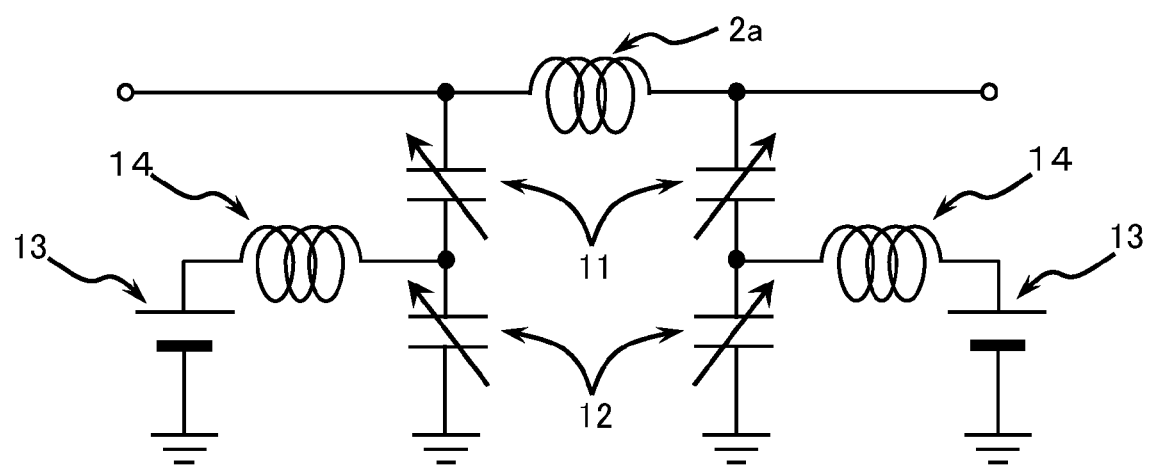
FIG. 20 illustrates an equivalent circuit diagram of the Π matching circuit element shown in FIG. 19 and a DC power connected thereto.

FIG. 17 is a plan view that shows a Γ matching circuit element E1 in which an inductor 2a is provided in the signal line 2 of the variable capacitor A3 shown in FIG. 5. FIG. 18 shows an equivalent circuit diagram which shows the Γ matching circuit element E1 and a DC power for supplying a driving voltage to the Γ matching circuit element E1. FIG. 19 is a plan view that shows a Π matching circuit element E2 in which a movable electrode 4 is further added to the variable capacitor A3 shown in FIG. 5 and an inductor 2a is provided in the signal line 2 at a position between the two movable electrodes 4. FIG. 20 shows an equivalent circuit diagram which shows a DC power for supplying a driving voltage and the Π matching circuit element E2 connected to the DC power.

Figure 21:
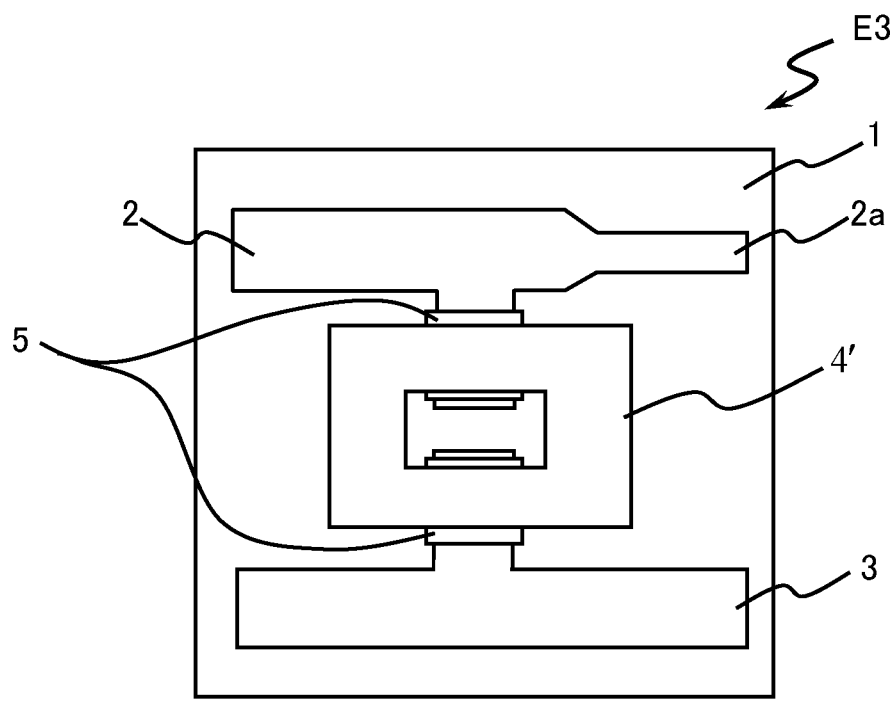
FIG. 21 illustrates a plan view of a Γ matching circuit element using the variable capacitor shown in FIG. 16.
Figure 22:
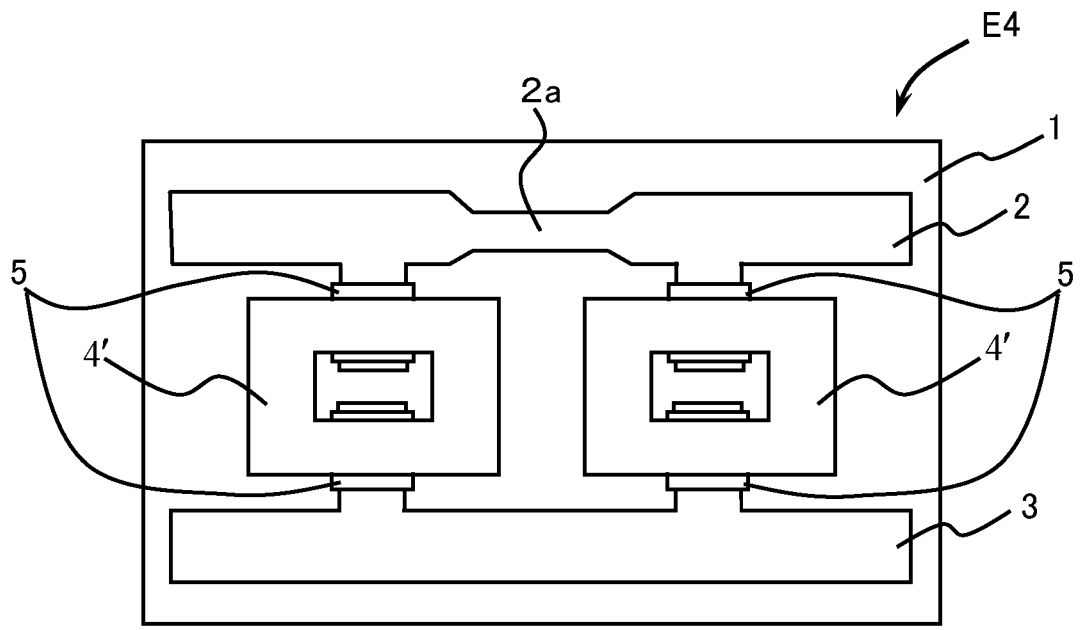
FIG. 22 illustrates a plan view of a Π matching circuit element using the variable capacitor shown in FIG. 16.

FIG. 21 is a plan view that shows a Γ matching circuit element E3 in which an inductor 2a is provided in the signal line 2 of the variable capacitor D1 shown in FIG. 16. The equivalent circuit diagram which shows a DC power for supplying a driving voltage to the Γ matching circuit element E3 and the Γ matching circuit element E3 connected to the DC power is the same as that of FIG. 18. FIG. 22 is a plan view that shows a Π matching circuit element E4 in which a movable electrode 4' is further added to the variable capacitor D1 shown in FIG. 16 and an inductor 2a is provided in the signal line 2 at a position between the two movable electrodes 4'. The equivalent circuit diagram when a DC power that supplies a driving voltage to the Π matching circuit element E4 is the same as that of FIG. 20.

These matching circuit elements employ the variable capacitor according to the above described first embodiment or fourth embodiment. Accordingly, it is possible to set a driving voltage to a lesser magnitude as compared with the existing matching circuit element, and it is possible to keep reliability. In addition, these matching circuit elements may be reduced in size as compared with the existing matching circuit element.

Figure 23:
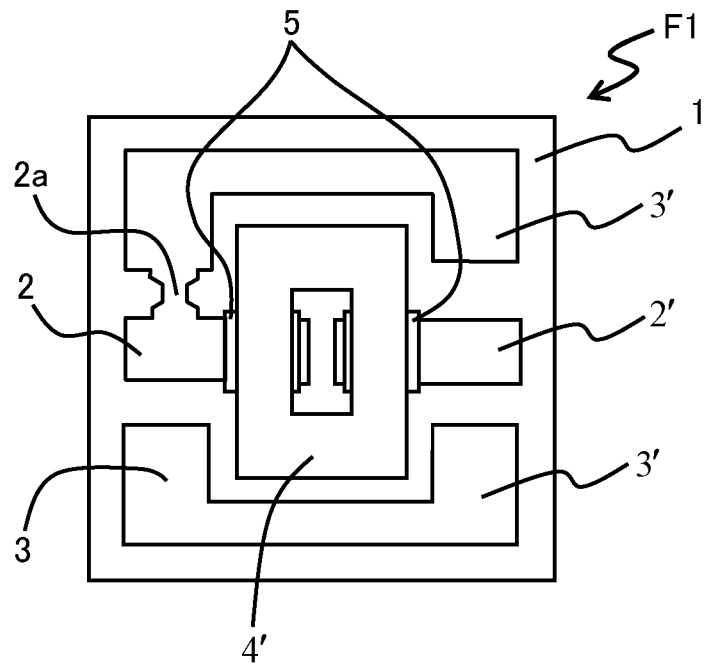
FIG. 23 illustrates a plan view of a Γ matching circuit element using the variable capacitor shown in FIG. 14.
Figure 24:
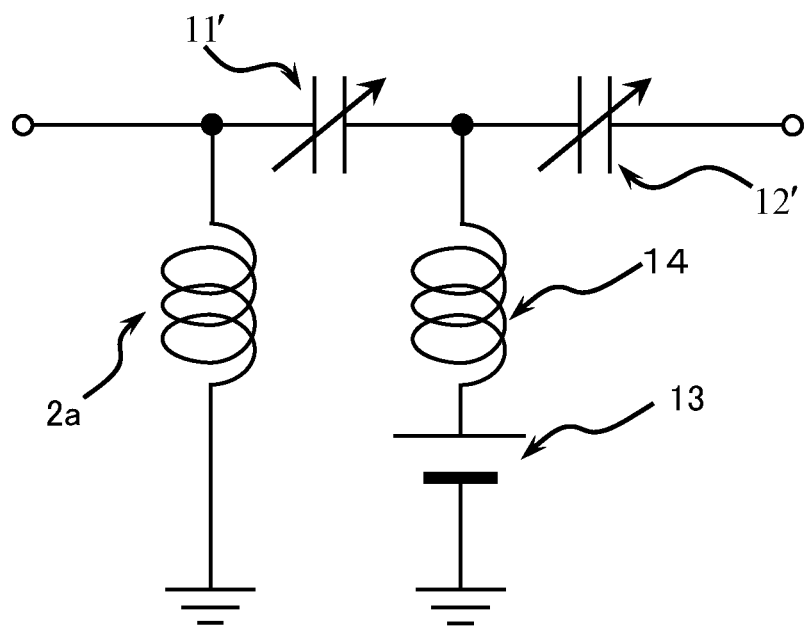
FIG. 24 illustrates an equivalent circuit diagram of the Γ matching circuit element shown in FIG. 23 and a DC power connected thereto.
Figure 25:
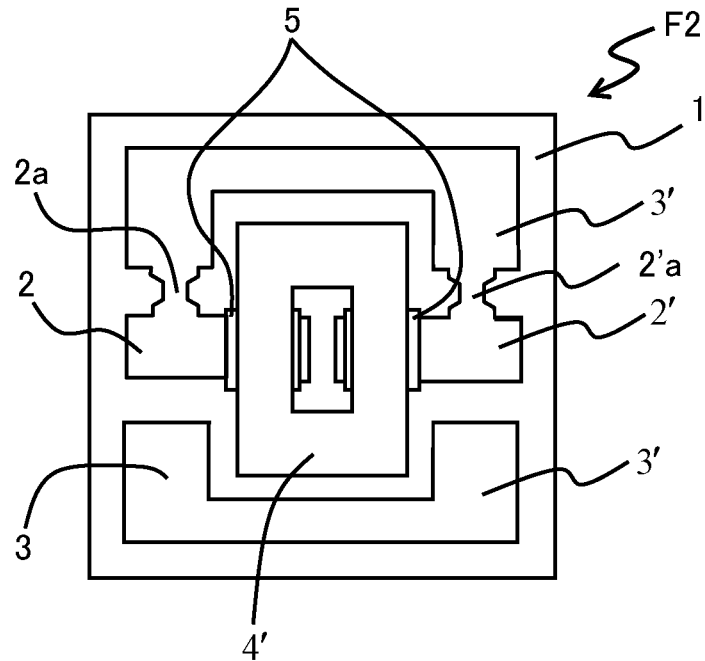
FIG. 25 illustrates a plan view of a Π matching circuit element using the variable capacitor shown in FIG. 14.
Figure 26:
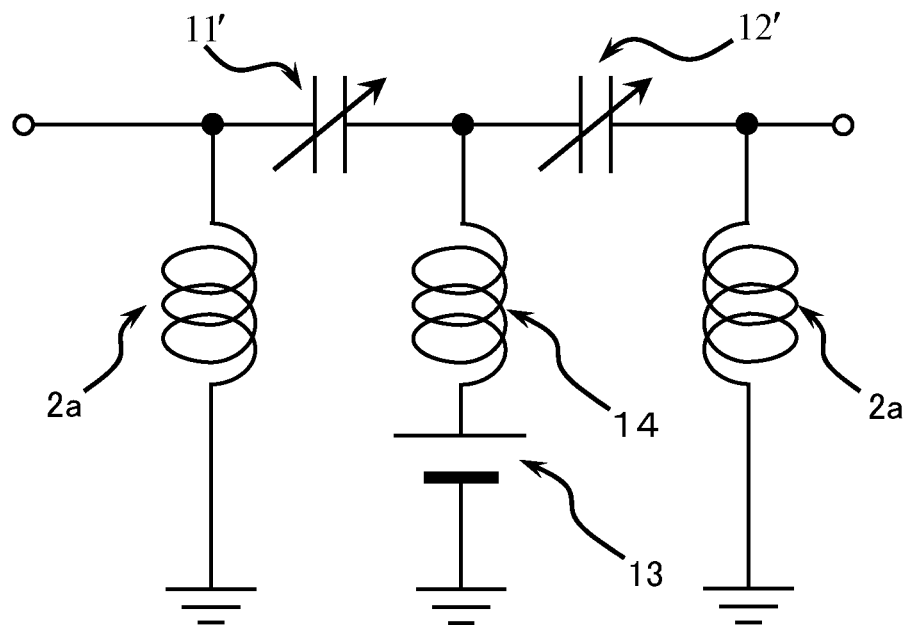
FIG. 26 illustrates an equivalent circuit diagram of the Π matching circuit element shown in FIG. 25 and a DC power connected thereto.

FIG. 23 is a plan view that shows a Γ matching circuit element F1 in which an inductor 2a is provided between the signal line 2 and ground electrode 3' of the variable capacitor C2 shown in FIG. 14. FIG. 24 shows an equivalent circuit diagram which includes a DC power for supplying a driving voltage to the Γ matching circuit element F1 and the Γ matching circuit element F1 connected to the DC power. FIG. 25 is a plan view that shows a Π matching circuit element F2 in which an inductor 2a and an inductor 2'a are respectively provided between the signal line 2 and ground electrode 3' and between the signal line 2' and ground electrode 3' of the variable capacitor C2 shown in FIG. 14. FIG. 26 shows an equivalent circuit diagram which includes a DC power for supplying a driving voltage to the Π matching circuit element F2 and the Π matching circuit element F2 connected to the DC power.

Because these matching circuit elements employ the variable capacitor according to the above described third embodiment, the size may be reduced as compared with the existing matching circuit element.

Figure 27:
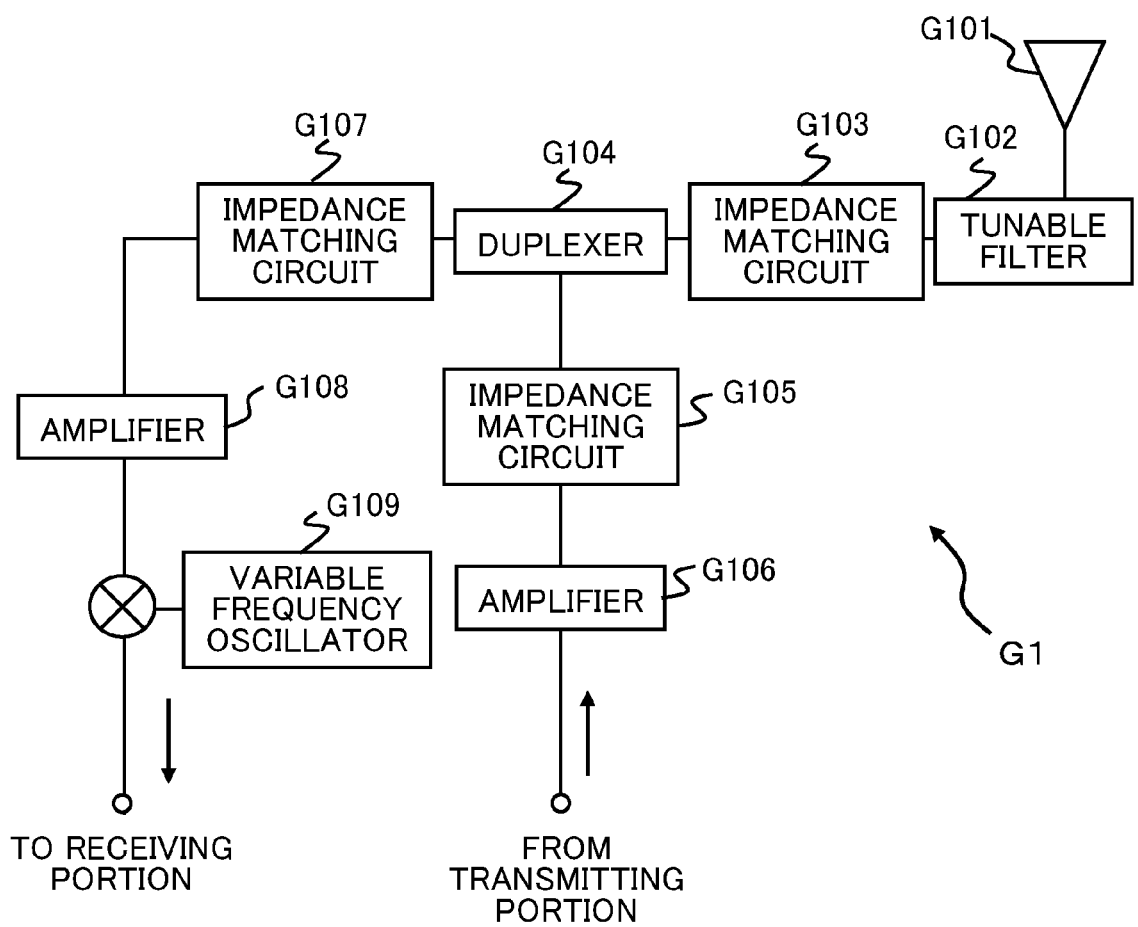
FIG. 27 illustrates a block diagram of a front end portion of a mobile terminal apparatus in which the variable capacitors and matching circuit elements according to the embodiments are used as electronic components.

The variable capacitor and matching circuit element according to the embodiments may be used as an electronic component of a mobile terminal apparatus. FIG. 27 is a block diagram that shows a front end portion of a mobile terminal apparatus in which the variable capacitors and matching circuit elements according to the embodiments are used as electronic components.

The front end portion G1 of the mobile terminal apparatus includes an adaptive array antenna G101 that uses a phaser, a tunable filter G102, a duplexer G104, impedance matching circuits G103, G105 and G107, amplifiers G106 and G108 each having a matching circuit, and a variable frequency oscillator G109 formed of a Voltage Controlled Oscillator (VCO).

In the front end portion G1, an RF signal (receiving signal) of a specific receiving band is extracted by the tunable filter G102 from an RF signal received by the adaptive array antenna G101, and is input to the amplifier G108 by the duplexer G104. The receiving signal is amplified in the amplifier G108, then mixed with a local signal output from the variable frequency oscillator G109 and converted to a predetermined intermediate frequency. Then, the converted signal is output to a receiving portion (not shown). In addition, an RF signal (transmitting signal) input from a transmitting portion (not shown) is amplified by the amplifier G106 and then input to the tunable filter G102 through the duplexer G104. The transmitting signal is radiated from the adaptive array antenna G101 after frequencies outside a specific transmitting band is removed by the tunable filter G102. The configurations and functions of the components G101 to G109 are typical, and therefore description thereof is omitted.

The variable capacitor according to the embodiments is used as an element for varying the frequency of the tunable filter G102 and the frequency of the variable frequency oscillator G109 in the front end portion G1 of the mobile terminal apparatus shown in FIG. 27. The matching circuit element according to the embodiments is used as the phaser of the adaptive array antenna G101, the impedance matching circuits G103, G105 and G107 and the matching circuits of the amplifiers G106 and G108. Thus, because it is possible to design the front end portion G1 to be smaller than that using the existing variable capacitor and matching circuit element, it is possible to reduce the size of a mobile terminal apparatus. In addition, because it is possible to set the driving voltage of each variable capacitor and each matching circuit element to a lesser magnitude, it is possible to keep reliability.

Note that it is not necessary to use the variable capacitor and the matching circuit element according to the invention in all the electronic components shown in FIG. 27; a mobile terminal apparatus that partially employs the variable capacitor and the matching circuit element according to the invention may also have the same advantageous effect.

The variable capacitor, matching circuit element and mobile terminal apparatus according to the invention are not limited to the above described embodiments. The specific configuration of each component of the variable capacitor, matching circuit element and mobile terminal apparatus may be variously changed in design.

What is claimed is:

1. A variable capacitor comprising:
a substrate;
a signal line disposed on a surface of the substrate for feeding a signal;
a ground electrode disposed on the surface of the substrate; and
a movable electrode opposed to the signal line and the ground electrode, the movable electrode being operable to move toward and away from the signal line and the ground electrode, wherein the movable electrode crosses the signal line and the entire ground electrode,
wherein the movable electrode is disposed on the surface through supporting members which are connected to both end of the movable electrode and a portion between the both end, and
wherein a space is provided between the substrate and at least one of the signal line and the ground electrode, the one of the signal line and the ground electrode is operable to move vertically to the surface.

2. The variable capacitor according to claim 1, wherein the movable electrode is operable to be displaced by an electrostatic attraction between the movable electrode and the signal line and between the movable electrode and the signal line, the electrostatic attraction is generated by a voltage applied to the movable electrode, and an amount of displacement of the movable electrode varies according to an amount of the voltage.

3. The variable capacitor according to claim 1, wherein the signal line and the ground electrode include a configuration of a coplanar waveguide.

4. The variable capacitor according to claim 1, wherein a dielectric layer is formed between the movable electrode and the signal line or between the movable electrode and the ground electrode.

5. A variable capacitor comprising:
a substrate;
an input electrode disposed on a surface of the substrate for receiving a signal;
an output electrode disposed on the surface of the substrate and disconnected electrically to the input electrode, the output electrode for outputting the signal; and
a movable electrode opposed to the input electrode and the output electrode, the movable electrode being operable to move toward and away from the input electrode and the output electrode
wherein at least one of the input electrode and the output electrode includes a dielectric layer on a surface thereof facing the movable electrode,
wherein the movable electrode is disposed on the surface through supporting members which are connected to both end of the movable electrode and a portion between the both end, and
wherein a space is provided between the substrate and at least one of the input electrode and the output electrode, the one of the input electrode and the output electrode is operable to move vertically to the surface.

6. The variable capacitor according to claim 5, wherein the movable electrode is operable to be displaced by an electrostatic attraction between the movable electrode and the input electrode and between the movable electrode and the output electrode, the electrostatic attraction is generated by a voltage applied to the movable electrode, and an amount of displacement of the movable electrode varies according to an amount of the voltage.

7. The variable capacitor according to claim 5, further comprising a ground electrode disposed on the substrate so as to be arranged apart from the input electrode and the output electrode, wherein the ground electrode includes a configuration of a coplanar waveguide.

8. The variable capacitor according to claim 5, wherein a dielectric layer is formed between the movable electrode and the input electrode or between the movable electrode and the output electrode.

9. A matching circuit element comprising:
a variable capacitor including:
a substrate;
a signal line disposed on a surface of the substrate for feeding a signal;
a ground electrode disposed on the surface of the substrate; and
a movable electrode opposed to the signal line and the ground electrode, the movable electrode being operable to move toward and away from the signal line and the ground electrode, wherein the movable electrode crosses the signal line and the entire ground electrode,
wherein the movable electrode is disposed on the surface through supporting members which are connected to both end of the movable electrode and a portion between the both end, and
wherein a space is provided between the substrate and at least one of the input electrode and the output electrode, the one of the input electrode and the output electrode is operable to move vertically to the surface.

10. A mobile terminal apparatus comprising:
a variable capacitor including:
a substrate;
a signal line disposed on a surface of the substrate for feeding a signal;
a ground electrode disposed on the surface of the substrate; and
a movable electrode opposed to the signal line and the ground electrode, the movable electrode being operable to move toward and away from the signal line and the ground electrode, wherein the movable electrode crosses the signal line and the entire ground electrode, wherein the movable electrode is disposed on the surface through supporting members which are connected to both end of the movable electrode and a portion between the both end, and wherein a space is provided between the substrate and at least one of the input electrode and the output electrode, the one of the input electrode and the output electrode is operable to move vertically to the surface.

11. A variable capacitor comprising:

a substrate;

an input electrode disposed on a surface of the substrate for receiving a signal;

an output electrode disposed on the surface of the substrate and disconnected electrically to the input electrode, the output electrode for outputting the signal, ends of the output electrode and the input electrode being opposed each other; and a movable electrode opposed to the input electrode and the output electrode, the movable electrode operable to move toward and away from the input electrode and the output electrode, the movable electrode including an opening at a portion corresponding to the ends, wherein the movable electrode is disposed on the surface through supporting members which are connected to both end of the movable electrode and a portion between the both end, and wherein a space is provided between the substrate and at least one of the input electrode and the output electrode, the one of the input electrode and the output electrode is operable to move vertically to the surface.

12. A variable capacitor comprising:

a substrate;

an input electrode disposed on a surface of the substrate for receiving a signal;

an output electrode disposed on the surface of the substrate and disconnected electrically to the input electrode, the output electrode for outputting the signal, the output electrode and the input electrode being arranged in parallel to each other; and a movable electrode opposed to the input electrode and the output electrode, the movable electrode being operable to move toward and away from the input electrode and the output electrode, wherein a space is provided between the substrate and at least one of the input electrode and the output electrode, the one of the input electrode and the output electrode is operable to move vertically to the surface.

* * * * *